3,294,489
PROCESS FOR PREPARING CARBON FIBERS

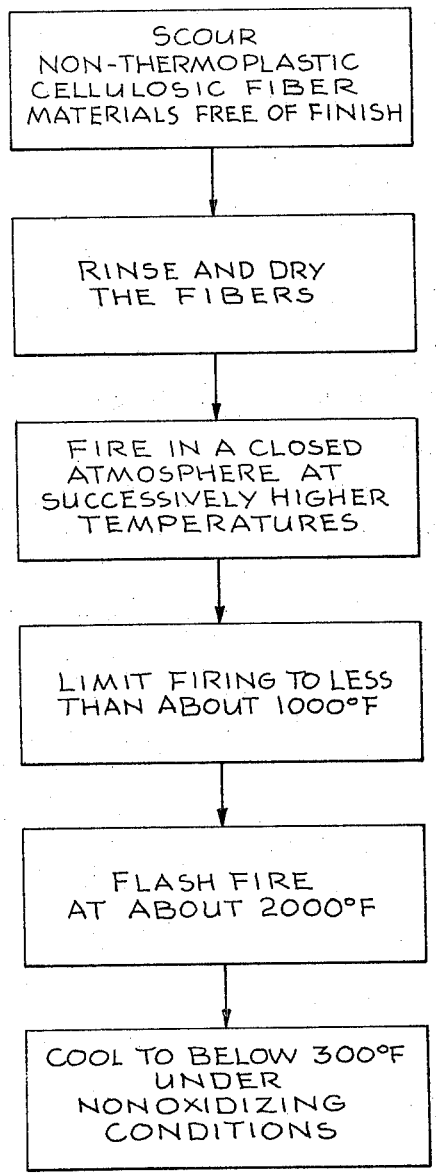

Richard B. Millington, Los Angeles, and Robert C. Nordberg, La Mirada, Calif., assignors to Hitco, a corporation of California
Filed Dec. 19, 1961, Ser. No. 160,605
5 Claims. (Cl. 23—209.4)

This invention relates to the production of carbon fibers, and particularly to fibers useful in ablation, corrosion and temperature resistant products and as insulating and filtering materials.

Most present high temperature bodies (e.g. rocket nozzles, heat shields, engine liners) use a high temperature plastic binder together with special reinforcing fibers. The fibers may be glass, asbestos, oxides, mineral wool, high purity (in excess of 99%) silica, or other materials which have high melting points with good strength and resistance to erosion effects. The fibers may be essentially continuous and woven into a textile form or they may be used in short lengths, depending upon the shape of the fabricated body and the application. The fiber reinforcements impart high strength and uniform mechanical properties to the formed structures.

The graphitized form of carbon has been widely used in high temperature applications. Fibers of graphite have been formed by reducing cellulosic materials, such as cotton and rayon, to a carbon constituent at extremely high temperatures. Although lower in tensile strength than other materials, they may be made to have improved flexural characteristics and may easily be integrated into composite bodies. Further, the sublimation point of graphite is very high, and the material is resistant to many types of corrosive attack. It may thus be used in many ways and for many purposes. Graphite fibers are light in weight, flexible, inert for most purposes and have strength characteristics which increase with temperature. Fabrics alone may be used as filters in chemical processes, or as lining and fire walls or in industrial processes where corrosive hot gases destroy other materials. Bonded or molded composite structures may be employed wherever high heat stresses are encountered.

From the standpoint of erosion resistance, graphite and graphite molding compounds have potentials superior to most other materials. They may be used at points of extreme thermal stress, such as constricted areas of rocket engine nozzles and exit cone inserts. Heretofore, however, such structures have been unpredictable because of spalling characteristics. Graphite structures have high heat conductivity and therefore provide little thermal insulative protection, so that added insulation must be used. Partially graphitic structures present the same difficulties.

Weight is of course a primary consideration in any vehicle or craft using high temperature effects. In this respect the thermal conductivity of amorphous carbon is of material significance. It is much lower than that of graphite and rises much less with temperature increases. Because of their superior cold-side properties, carbon fibers of strength equal to or greater than graphite fibers would have many advantages. A carbon fiber structure is therefore sought which is non-graphitic, uniform, easy to mold, has good ablation characteristics and good resistance to char as well as high strength. The process for preparing the fibers should be simple, consistent and repeatable, and suitable for continuous or high production of many kinds of fiber forms.

Processes according to the present invention may start with commerically available cellulose rayon fabrics, rovings or yarn. The fabrics are usually converted to carbon fabrics, while rovings and yarns are chopped into short lengths. An important first step is making sure that the fibers are substantially clean of impurities and finish or lubricants. Usually, the fibers are scoured by thorough washing with a heavy duty detergent in heated water, with stirring and circulation. After adequate soaking the fibers are washed free of soap with sprays and a sufficient number of rinsings.

Thereafter, the fibers are dried in preperation for conversion to a non-graphitic carbon form. In the conversion process successive heating steps are employed, in which the fibers are exposed to progressively higher temperatures. In accordance with the invention, the highest temperature used in the progressive heating (up to 1000° F.) is well below the extreme temperatures heertofore used in obtaining complete conversion to the carbon form. The fiber material is broken down into carbon fibers, and volatile materials are driven off. The formation of the volatiles is, however, limited and yield is high.

A feature of the conversion process is the use of a final, materially higher, flashing temperature (e.g. about 2000° F.) for a relatively short time following the earlier heating steps. The flashing step may markedly improve thermal characteristics of the product.

Fibers and fiber structures thus provided have high strength, excellent temperature and ablation characteristics and are fully uniform. They may be used separately or as part of composite bodies in many different ways.

A better understanding of the invention may be had by reference to the following description, taken in conjunction with the accompanying drawing, the sole figure of which shows successive steps which may be employed in a process in accordance with the invention.

Processes for producing fibers according to the invention may utilize cellulosic materials which are of the non-thermoplastic type. That is, under thermal stress these materials normally decompose prior to melting, as opposed to the thermoplastic series of cellulose derivatives which melt before decomposition. Included in the preferred class of materials are various cellulosic forms such as viscose, rayon, cotton, wool, and the rayon product sold under the trademark "Fortisan" by the Celanese Corp. of America. These materials are usually obtained as fabrics, rovings, or yarn, which may then be processed depending upon the final use for the product. A skein of the fabric may be converted directly to the essentially pure carbon form, or cut into relatively small fabric pieces and then converted. The yarns and roving may be chopped to short lengths (e.g. ¼″) so that a fluffy mass of relatively random fibers results from the processing. Each of these forms has some advantages for particular end uses.

Whether the fibers are retained as lengths of fabric or chopped, care should be taken to avoid affixed or added impurities. Where a chopping device has been used for cutting glass fiber textiles, for example, the device should be thoroughly cleaned to avoid inclusion of minute glass impurities.

Commercially available rayon products are usually coated, during production of the rayon fibers, with various lubricants or plasticizers for greater strength and abrasion resistance, and better hand. These finish materials, usually a mineral oil with a wetting agent, are substantially all ether extractable. It is important that these constituents be eliminated or reduced to a very low proportion relative to the fiber material. Rayon usually has about 3% by weight of such finishing materials, but this should be reduced to about 0.25% or less ether extractables. The amount of plasticizer may be reduced by variation of the initial fiber production process, and if the amount of ether extractables is kept below 0.50% fabrics and rovings can in some instances be used without cleaning. It is preferred, however, to take positive steps to eliminate such constituents. In the subsequent firing steps, these finishing or plasticizing materials are found to decompose into products which accelerate the degradation of the cellulose materials.

The preferred method of removing the finish is to scour the fibers thoroughly, then to rinse them clean and dry them. The fibers may be placed in a heated water solution of heavy duty detergent, and mixed thoroughly for an hour or more. Loose fibers may be placed in polypropylene bags for these purposes, while skeins of fabrics may be disposed about a central support with adequate separation for good circulation. Thereafter, the fibers are rinsed successively and thoroughly until they are entirely detergent free. Initial rinses in a tank may be followed by continuous rinsing and extraction in a centrifugal extractor.

It is then preferred to dry the scoured fibers immediately. The fabrics may be heated in skein form at about 250° F., while the chopped fibers may be placed on a heat resistant (e.g. glass fiber) cloth and dried at a like temperature. For most uniform drying, the depth of the chopped fibers should be limited so that there will be good heat penetration and circulation. The dried fibers should be sealed from moisture if they are not to be used immediately.

After drying, an external agent may be applied to the fibers for improved yield. The agent may be from the class of compounds generally spoken of as having flameproofing properties, such as the phosphates, borates, and certain chlorides. The mechanisms involved in the use of these flameproofing agents combine to limit combustion, so that a higher weight of carbon remains in the product. It is thought that the flameproofing agents function in a number of different ways to increase the yield of carbon fibers obtained. They are believed to generate a non-flamable gas at the fiber surface, thereby choking off the fire; provide a surface coating on the fibers; and accelerate formation of the carbonaceous char materials at the expense of the volatiles.

The heating cycles employed for fabrics or random fiber masses may use batch or continuous firing furnaces. In each instance at least the initial heating steps are carried out in a confined atmosphere, such as a gas or electrically heated tank having a vent for the gases of decomposition. For fabrics, the heating cycle proceeds relatively slowly, in steps of about 50° F. or less, starting with an initial temperature in excess of that used in drying. Fabric materials are held at each temperature level selected for a long enough time to insure uniform heating before proceeding to the next step. A thin layer of random fibers, by contrast, may be heated more rapidly. In either case, conversion to carbon may be substantially completed at temperature levels such as 700° F., far below those heretofore used.

The use of an enclosed heating chamber provides an essentially oxygen and moisture free environment for the decomposition of the cellulosic materials. Under these conditions, the cellulose first loses water, then forms intermediate levoglucosan products, and finally breaks down from the levoglucosan products into carbonaceous char and volatile tars. The char products are the principally carbon fibers, while the volatile tars are driven off and conveniently burned. Heating cycles in accordance with the invention are carried out slowly, with a number of advantages. The degradation of the cellulose is caused to take place with relatively low rates of formation of the volatile tars. Thus high carbon yields are obtained, and excellent physical properties are established.

Although a closed or inert atmosphere is employed in preferred processes, it is also feasible to use oxidizing atmospheres for certain materials. The degradation of the polymer may proceed in a different and accelerated manner because of incorporation of oxygen into the polymer chain. Thus the presence of oxygen atoms may increase the significance of the chain condensation reaction leading to carbon formation and also limit tendencies toward formation of ordered graphite structures. At the same time, the increased degradation rate will lower the yield which is obtained.

In the successive heating steps, care must be taken to avoid damage caused by exothermic reactions. Fabrics are particularly apt to be damaged because of the rapid shrinkage occurring under these conditions, whereas in contrast the short unrestrained fibers may slump without restraint. It is therefore preferred to heat the fabrics for somewhat longer times, and in more gradual steps.

Particular note should be taken of the fact that primarily carbonaceous structures are thus provided by processes in accordance with the invention at much lower temperatures than heretofore thought feasible. Previously it had been considered necessary to exceed 750° F. to commence decomposition of the cellulosic materials, and to exceed 1300° F. to eliminate free radicals and achieve full carbonization. As a typical example, 94% carbon, on a moisture free basis, may be obtained using a final temperature of 750° F.

After completing the principal part of the heating cycle, in which a temperature in the range of 700° F. is reached, the fibers are subjected to a brief firing at an appreciably higher temperature, of about 2000° F. The higher temperatures and relatively shorter times involved usually require the use of a separate heating system for the final step. If a batch type heater is used the material is cooled down to handling temperatures by purging the initial heating system with an appropriate gas, such as $CO_2$. The final heating step is effectively a "flash" firing at about 2000° F. The flash firing is best visualized in conjunction with fabric materials, which may be exposed to this temperature for only a few seconds in a continuous furnace. In order to limit subsequent combustion, however, it is preferred to immediately quench the fibers to a suitable lower temperature. Short fiber masses may be fired at the final temperature for a number of hours, and cooled in a closed atmosphere until below about 300° F. so as to prevent re-ignition. The use of the flash firing step materially augments the ability of the fibers to withstand subsequent temperature and erosive effects by further eliminatnig excess volatiles and further shrinking the structure. Without such firing, the fibers tend to disintegrate into separate masses, and laminated structures are much more likely to de-laminate under thermal stresses. The flash firing therefore appears to inhibit further activity of the carbon fibers.

The final temperature reached in the lower temperature heating may be in excess of 700° F., but may not be appreciably less. It is found that temperatures at or in excess of 700° F. provide adequate resistance in the carbon fibers to the shock of the subsequent flash firing. It is desirable, of course, to use the lowest feasible temperatures, in order to keep the cost of equipment and fuel to a minimum. Temperatures of about 1000° F. are still well below those previously used. The speed with which fibers may be taken through a heating cycle is dependent in large measure on the speed of heat transference to the innermost fibers, and the likelihood of excessive exothermic heating. The heating steps for individual fabric pieces in a closed tank, for example, may be carried out in 2 hours or less.

Fibers produced in fabric or loose mass form in accordance with the invention exhibit no crystallinity when examined by X-ray diffraction techniques. The fibers thus are free of graphitic structure, which is borne out by low thermal conductivities which they exhibit in elemental or combined form. The materials have a sublimation point between 6300°–6600° F., although they are converted to graphite structure prior to reaching this temperature. These properties are particularly advantageous for ablation uses, because structures using the fibers can reach extremely high temperatures before beginning to erode. The erosion then takes place at a slow and uniform rate, while the interior side of the member having the exposed surface remains relatively cool. Fiber strengths are in excess of comparable graphite fibers, providing a further advantage.

Examples of processes in accordance with the invention are as follows:

*Example 1.*—A "Fortisan" 1600 denier yarn was chopped to approximately ¼″ segments in a chopping device which was thorouhgly cleaned before using. The fibers were placed in polypropylene bags having a detergent solution of 1 lb. of "Artic Syntex HD" (a product of Colgate-Palmolive Co.) for each 60 gallons of water and 100 lbs. of fiber. The mixture was maintained at a temperature of 170° F. minimum for 1 hour. Each 15 minutes the mixture was stirred thoroughly for good wetting and circulation. Thereafter, the fibers were poured into a centrifugal extractor, and subjected to a continuous fine water spray during the extraction until the leaving rinse water was clear and soap free.

After washing, the fibers were dried by being placed in thin layers on glass cloth and subjected to a temperature of 250° F. until dry.

The heating was accomplished in a closed steel tank, with internal temperatures monitored by a thermocouple system. Gases of decomposition were vented through a burning system. The following schedule was employed:

| Temp., °F. | Hrs. | Temp., °F. | Hrs. |
|---|---|---|---|
| 400 | 12 | 600 | 12 |
| 450 | 12 | 650 | 12 |
| 500 | 12 | 700 | 12 |
| 550 | 12 | | |

After completion of the final heating step the fibers were cooled to below 300° F. by purging the tank with $CO_2$. The fiber mass was then placed in an Inconel tank and the temperature raised to 2000° F. and held for 8 hours. Thereafter the tank and fibers were allowed to cool without the admission of air down to 300° F.

When these short fibers are used as reinforcement materials the composite bodies are particularly uniform and free from cracking and spalling.

*Example 2.*—"Fortisan" fabric material was scoured in a solution of "Artic Syntex HD" detergent, a product of the Colgate-Palmolive Co., in the concentration per pound of fiber given above. The solution was maintained at 170° F. and the textile was soaked for an hour, with intermediate lifting and draining every 15 minutes. After the final draining the fabric was rinsed by immersion in successive baths of clean cold water. In each rinse bath the fabrics were soaked for 1 minute and then lifted and drained for 4 minutes before the next changes of water. After the last change the fabrics were placed in an extractor, which was run for 3½ hours with a fine water spray continually playing on the material. Thereafter the textiles were immediately dried.

For the heating cycle the fabrics were wound in skein form, supported on a 5″ diameter steel roll and placed in a closed tank. The following heating steps were used:

| Temp., °F. | Hrs. | Temp., °F. | Hrs. |
|---|---|---|---|
| 360 | 24 | 480 | 12 |
| 380 | 24 | 500 | 12 |
| 400 | 30 | 550 | 12 |
| 420 | 30 | 600 | 12 |
| 440 | 30 | 650 | 12 |
| 460 | 24 | 700 | 12 |

The fabric was then cooled down to below 300° F. before removal of the skein. The fabric was then made into a roll, and flash fired by running through a continuous furnace. The furnace was maintained at 2200° F., and the rate of passage of the fabric was adjusted to give an exposure time at this temperature of about 10 seconds. The heated fabric was immediately immersed in a tank of water on leaving the furnace, rolled up, and dried at 250° F.

While there have been described above various processes by which carbon fibers of high strength and physical integrity may be provided by decomposition and elimination of volatile materials at relatively low temperatures, it will be appreciated that the invention is not limited thereto. Accordingly, the invention should be considered to include all variations and alternative processes falling within the scope of the appended claims.

What is claimed is:

1. The method of preparing carbon fiber fabrics having high strength and resistance to erosion which includes the steps of washing a rayon fabric in a detergent solution to remove finish materials to below about 0.25% ether extractables, rinsing the washed fabric free of finish materials and the detergent solution, drying the fabric, winding the fabric into a skein, heating the fabric skein in a closed atmosphere in successive steps, each step lasting in excess of about twelve hours and being about 20° F. to 50° F. higher than the previous step, the temperature starting at about 360° F. and being raised up to about 700° F., to drive off excess water and to first form intermediate levoglucosan products and finally carbonaceous chars and volatile tars, the carbonaceous chars constituting non-graphitic carbon fibers, cooling the carbon fiber fabric thus formed to below about 300° F., flash firing the carbon fiber fabric by feeding the fabric through an approximately 2200° F. environment for an exposure time of about ten seconds, cooling the flash fired fabric by quenching in water substantially immediately after exposure to the high temperature environment, and drying the fabric.

2. The method of preparing non-graphitic carbon fibers having high strength which consists of the steps of subjecting cellulosic fibers to a plurality of successively higher heating steps in a closed atmosphere over the range of about 350° to about 700° F., the temperature at each one of said steps being from 20° to 50° F. higher than the preceding step, maintaining a constant temperature at each one of said steps for at least two hours duration, and after completion of the last said heating step at about 700° F. flash firing said fibers by placing them in a zone maintained at about 2000 to 2200° F. for about 10 seconds to heat stabilize and shrink said fibers.

3. The method set forth in claim 2 wherein the fibers are cooled to below about 300° F. after completion of the last heating step at about 700° F. and before said flash firing step.

4. The method set forth in claim 2 wherein a constant temperature is maintained at each one of said steps for 8–30 hours.

5. The method set forth in claim 2 wherein said fibers comprise rayon fibers.

References Cited by the Examiner

UNITED STATES PATENTS

| 2,591,024 | 4/1952 | Sweitzer | 23—209.1 X |
| 2,915,370 | 12/1959 | Mitchell | 23—209.1 |
| 3,011,981 | 12/1961 | Soltes | 23—209.2 X |
| 3,053,775 | 9/1962 | Abbott | 252—421 |
| 3,057,687 | 10/1962 | Mitchell | 23—209.1 |
| 3,107,152 | 10/1963 | Ford et al. | 23—209.2 |
| 3,116,975 | 1/1964 | Cross et al. | 23—209.4 |

MILTON WEISSMAN, *Primary Examiner.*

MAURICE A. BRINDISI, OSCAR R. VERTIZ, BENJAMIN HENKIN, *Examiners.*

A. J. STEWART, E. J. MEROS, *Assistant Examiners.*